US012793868B1

(12) United States Patent
Alsalmi

(10) Patent No.: US 12,793,868 B1
(45) Date of Patent: Nov. 10, 2026

(54) SISN BETAVOLTAIC BATTERY

(71) Applicant: KING SAUD UNIVERSITY, Riyadh (SA)

(72) Inventor: Sheren Aowadh Alsalmi, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 3 days.

(21) Appl. No.: 19/660,567

(22) Filed: Apr. 28, 2026

(51) Int. Cl.
*G21H 1/02* (2006.01)
*G21H 1/00* (2006.01)
*G21H 1/04* (2006.01)

(52) U.S. Cl.
CPC ................. *G21H 1/02* (2013.01); *G21H 1/00* (2013.01); *G21H 1/04* (2013.01)

(58) Field of Classification Search
CPC .. G21H 1/00; G21H 1/02; G21H 1/04; G21H 1/06; G21H 1/12
USPC .................................................. 310/301, 303
See application file for complete search history.

(56) References Cited

U.S. PATENT DOCUMENTS 5,721,462 A * 2/1998 Shanks .................... G21H 1/04 136/258
2015/0024586 A1 1/2015 Zhao et al.
2022/0223310 A1 * 7/2022 Scott ........................ G21H 1/02
2023/0371381 A1 11/2023 Jones et al.

FOREIGN PATENT DOCUMENTS

CN 120496907 A * 8/2025
WO 2024123921 A2 6/2024

OTHER PUBLICATIONS

Sun et al., GA2O3 Hetero-junction Beta Irradiation Battery with Multi-groove Radioactive Source, Aug. 15, 2025, CN 120496907 (English Machine Translation) (Year: 2025).*
Aydin, Selim, et al. "Investigation of nickel-63 radioisotope-powered GaN betavoltaic nuclear battery." International Journal of Energy Research 43.14 (2019): 8725-8738.

* cited by examiner

*Primary Examiner* — Alexander A Singh
(74) *Attorney, Agent, or Firm* — Nath, Goldberg & Meyer; Joshua B. Goldberg

(57) ABSTRACT

The SiSn betavoltaic battery uses a silicon-tin (SiSn) alloy as an active semiconductor layer. The SiSn active semiconductor layer is sandwiched between top and bottom electrodes. A source of beta radiation is located adjacent to the top electrode. The SiSn active semiconductor layer may be a silicon-tin alloy with a concentration of the tin being between 1% and 15% of the silicon-tin alloy by atomic percentage. Alternatively, the SiSn active semiconductor layer may be a $Si_{0.95}Sn_{0.05}$ alloy. The top electrode may be made from graphene and the bottom electrode may be made from gold. The bottom electrode and the SiSn active semiconductor layer may form a Schottky junction. The source of beta radiation may be any suitable beta radiation source, such as $^{63}$Ni, $^{14}$C, or $^{147}$Pm.

11 Claims, 11 Drawing Sheets

SISN BETAVOLTAIC BATTERY

BACKGROUND

Field

The disclosure of the present patent application relates to betavoltaic batteries, and particularly to a betavoltaic battery with a silicon-tin (SiSn) alloy as an active semiconductor layer.

Description of Related Art

Betavoltaic batteries are specialized nuclear-powered cells that generate low-level, continuous electricity for decades by converting radiation from isotopes (e.g., tritium or nickel-63) into electrical energy using semiconductors. Betavoltaic batteries are typically considered to be very reliable, safe, and maintenance-free, and are commonly used for powering medical implants, aerospace sensors, and long-term remote monitoring devices. In contrast with most nuclear power sources, which use nuclear radiation to generate heat, which then is used to generate electricity, betavoltaic batteries use a non-thermal conversion process, specifically by converting the electron-hole pairs produced by the ionization trail of beta particles traversing a semiconductor.

Conventional betavoltaic batteries commonly use silicon (Si) or gallium nitride (GaN) semiconductor junctions. However, these semiconductor materials face limitations in balancing carrier mobility, beta absorption, and radiation hardness. Thus, alternative active layer materials are of great interest, particularly materials which may provide a tunable band structure and strong infrared absorption while remaining compatible with standard silicon complementary metal-oxide-semiconductor (CMOS) technology and enabling monolithic photonic-electronic integration. Thus, a SiSn betavoltaic battery solving the aforementioned problems is desired.

SUMMARY

The SiSn betavoltaic battery uses a silicon-tin (SiSn) alloy as an active semiconductor layer. The SiSn active semiconductor layer is sandwiched between top and bottom electrodes. A source of beta radiation is located adjacent to the top electrode. The SiSn active semiconductor layer may be a silicon-tin alloy with a concentration of the tin being between 1% and 15% of the silicon-tin alloy by atomic percentage. Alternatively, and as a non-limiting example, the SiSn active semiconductor layer may be a $Si_{0.95}Sn_{0.05}$ alloy. As a further alternative, the concentration of the tin (Sn) may vary as a function of thickness of the SiSn active semiconductor layer.

As a non-limiting example, the top electrode may be made from graphene and the bottom electrode may be made from gold. The bottom electrode and the SiSn active semiconductor layer form a Schottky junction. The source of beta radiation may be any suitable beta radiation source, such as, but not limited to, $^{63}$Ni, $^{14}$C, or $^{147}$Pm.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
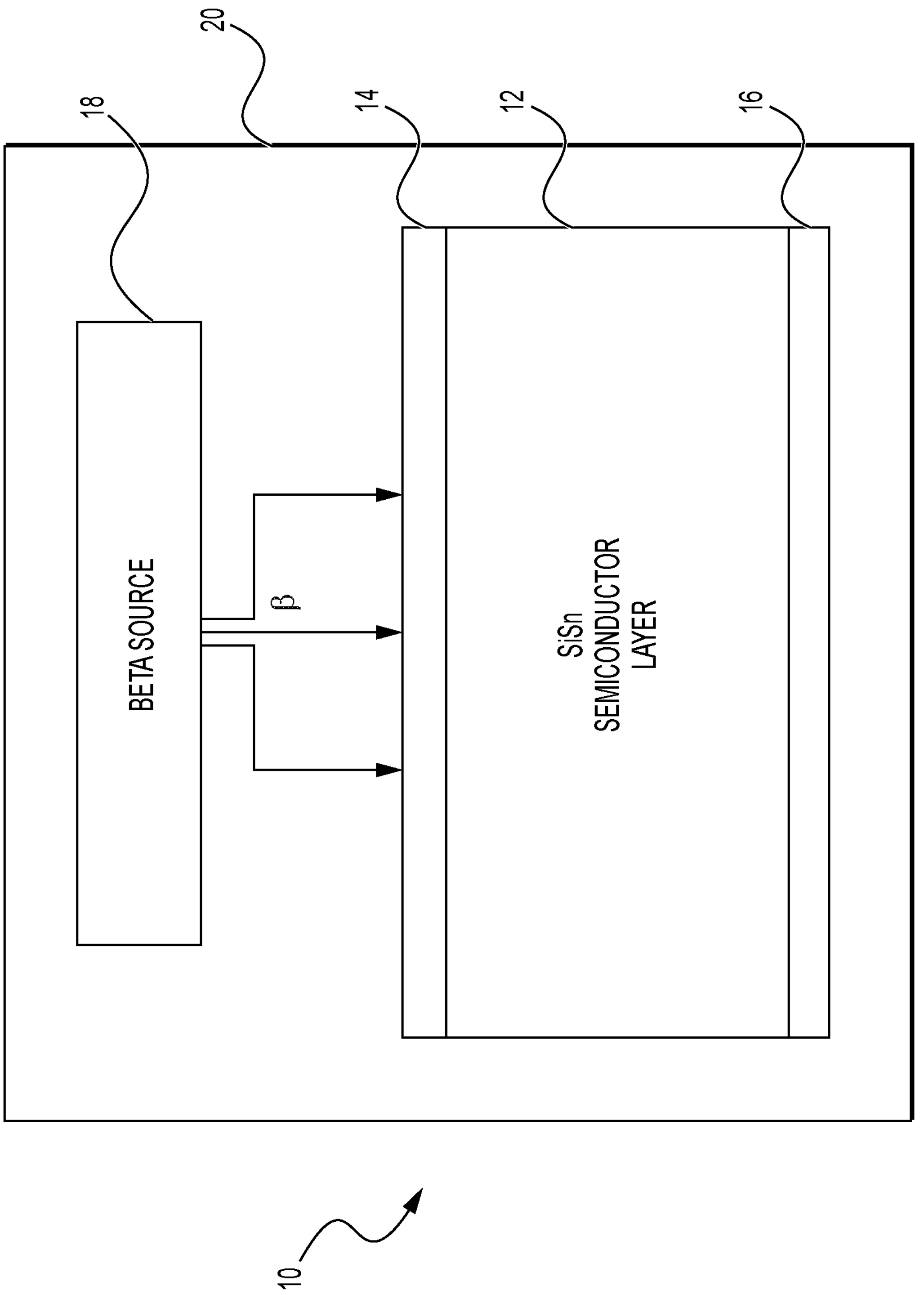
FIG. 1 diagrammatically illustrates a SiSn betavoltaic battery.

Referring to FIG. 1, the SiSn betavoltaic battery 10 uses a silicon-tin (SiSn) alloy as an active semiconductor layer 12. The SiSn active semiconductor layer 12 is sandwiched between top and bottom electrodes 14, 16, respectively. A source of beta (β) radiation 18 is located adjacent to the top electrode 14. The SiSn active semiconductor layer 12 may be a silicon-tin alloy with a concentration of the tin (Sn) being between 1% and 15% of the silicon-tin alloy by atomic percentage. Alternatively, and as a non-limiting example, the SiSn active semiconductor layer 12 may be a $Si_{0.95}Sn_{0.05}$ alloy.

It should be understood that the Sn concentration within the SiSn active semiconductor layer 12 may be implemented either as a uniform alloy composition or as a spatially graded composition (i.e., compositionally graded throughout the thickness of the active layer), depending on the desired device configuration. It should be further understood that the SiSn alloy semiconductor may also be doped, for example, using conventional p-type or n-type dopants, in order to tailor the electrical properties of the SiSn betavoltaic battery 10, depending on the selected junction architecture.

As a non-limiting example, the top electrode 14 may be made from graphene and the bottom electrode 16 may be made from gold. The bottom electrode 16 and the SiSn active semiconductor layer 12 may form a Schottky junction. The source of beta radiation 18 may be any suitable beta radiation source, such as, but not limited to, $^{63}$Ni, $^{14}$C, or $^{147}$Pm. As shown in FIG. 1, the SiSn active semiconductor layer 12, the top electrode 14, the bottom electrode 16 and the source of beta radiation 18 may be contained within a housing 20 or any other suitable type of enclosure. As is well-known in betavoltaic batteries, the graphene top electrode 12 acts as a transparent conductive layer for charge collection, the gold bottom electrode 16 serves as a reflective ohmic contact and provides for charge collection, and the SiSn active semiconductor layer 12 absorbs the beta particles and provides electron-hole (e-h) pair generation.

During operation, beta (β) particles emitted from the beta radiation source 18 penetrate the SiSn active semiconductor layer 12 and generate electron-hole (e-h) pairs within the active region 12. The built-in electric field associated with the junction structure separates these radiation-generated carriers and directs them toward the respective electrodes 14, 16 for collection. It should be understood that the SiSn active semiconductor layer 12 may be incorporated into any suitable type of junction configuration capable of providing such an electric field, including, but not limited to, semiconductor heterojunctions with materials such as Si, GaN, or other compatible semiconductors.

As non-limiting examples, the top electrode 14 and the bottom electrode may each have a surface area of approximately $4\times10^{-4}$ cm$^2$. The SiSn active semiconductor layer 12 may also have a cross-sectional area of approximately $4\times10^{-4}$ cm$^2$. The top electrode 14 may have a thickness of approximately 5 nm. The bottom electrode 16 may have a thickness of approximately 200 nm. The SiSn active semiconductor layer 12 may have a thickness ranging between approximately 1.0 μm to approximately 10 μm. The source of beta radiation 18 may be positioned approximately 20 μm above the top electrode 14. The activity of the source of beta radiation 18 may be approximately 1 MBq. In simulations, which will be described in greater detail below, the SiSn active semiconductor layer 12 was a $Si_{0.95}Sn_{0.05}$ alloy with an effective density of 2.6597 g/cm$^3$, which was obtained using a rule-of-mixtures calculation with elemental silicon and tin densities.

In the simulations, the SiSn active semiconductor layer 12, the top electrode 14, the bottom electrode 16 and the source of beta radiation 18 each had the exemplary dimensions and relative dimensions discussed above, and were contained within an air-filled cube with each edge having a length of 0.5 mm. In the simulations, the electrical output of the simulated SiSn betavoltaic battery was estimated from the total energy deposited in the SiSn active layer. Assuming a mean energy of 3.6 eV per generated electron-hole (e-h) pair, corresponding to the pair-creation energy in crystalline silicon, the average energy deposition per decay event ($\langle E_{dep} \rangle$) was converted into the number of generated charge carriers as $$p = \frac{\langle E_{dep} \rangle}{\varepsilon},$$

where ε is the e-h pair creation energy. Following this, both the collected charge per decay and the short-circuit current per unit decay rate $I_{sc}$ were calculated. For a nominal activity of 1 MBq (i.e., $10^6$ decays per second), the corresponding current is $I_{tot}=Q\times10^6$. The total current collected by the device is obtained by scaling with the actual source strength R, while the current density is computed as $$J = \frac{I_{tot}}{A},$$

where A represents the area of the SiSn layer ($4\times10^{-4}$ cm$^2$). This approach provides an upper limit estimate corresponding to ideal charge collection, neglecting carrier recombination and transport losses.

Figure 2A:
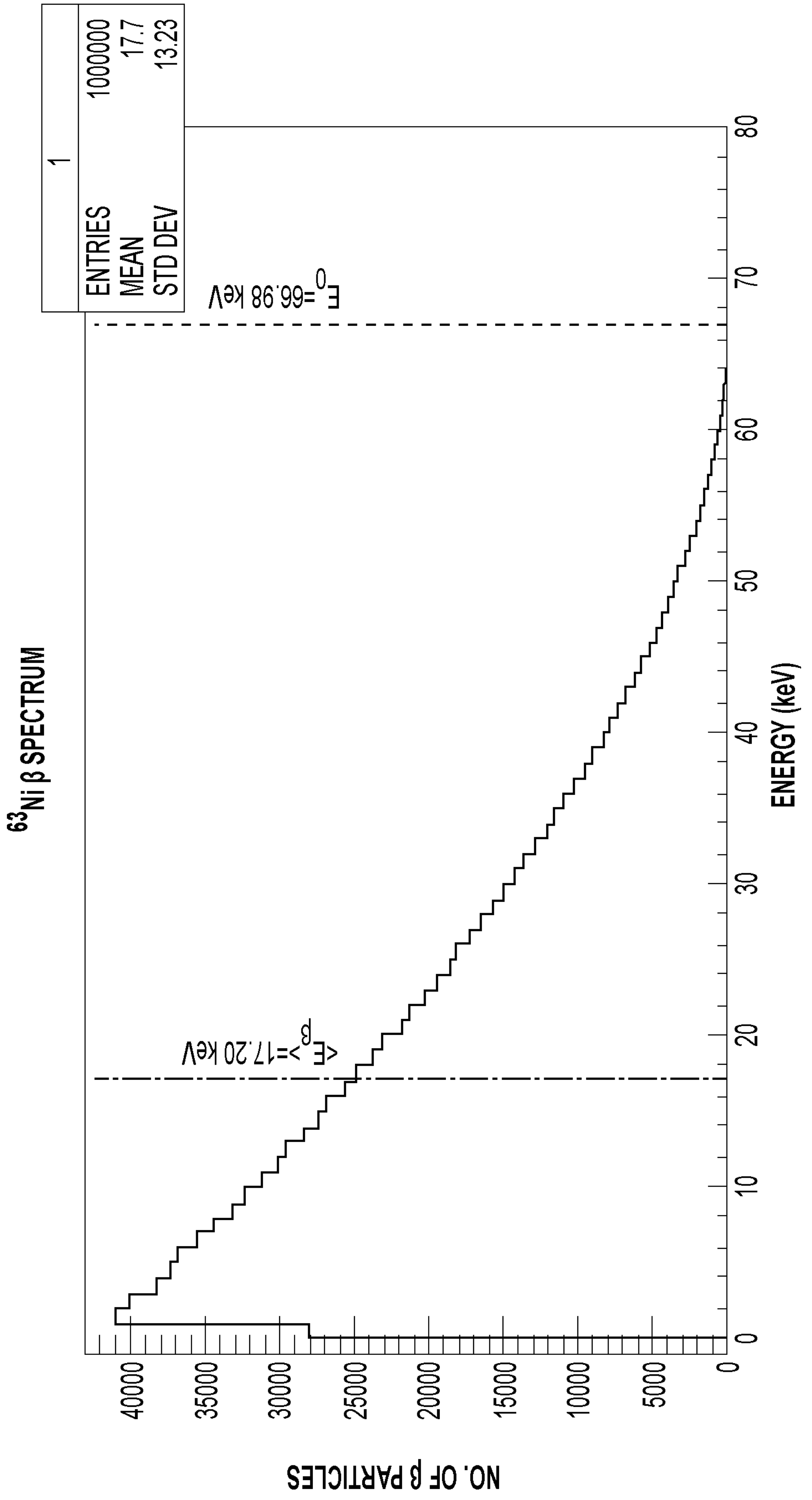
FIG. 2A shows the simulated beta (β) spectra for $^{63}$Ni.
Figure 2B:
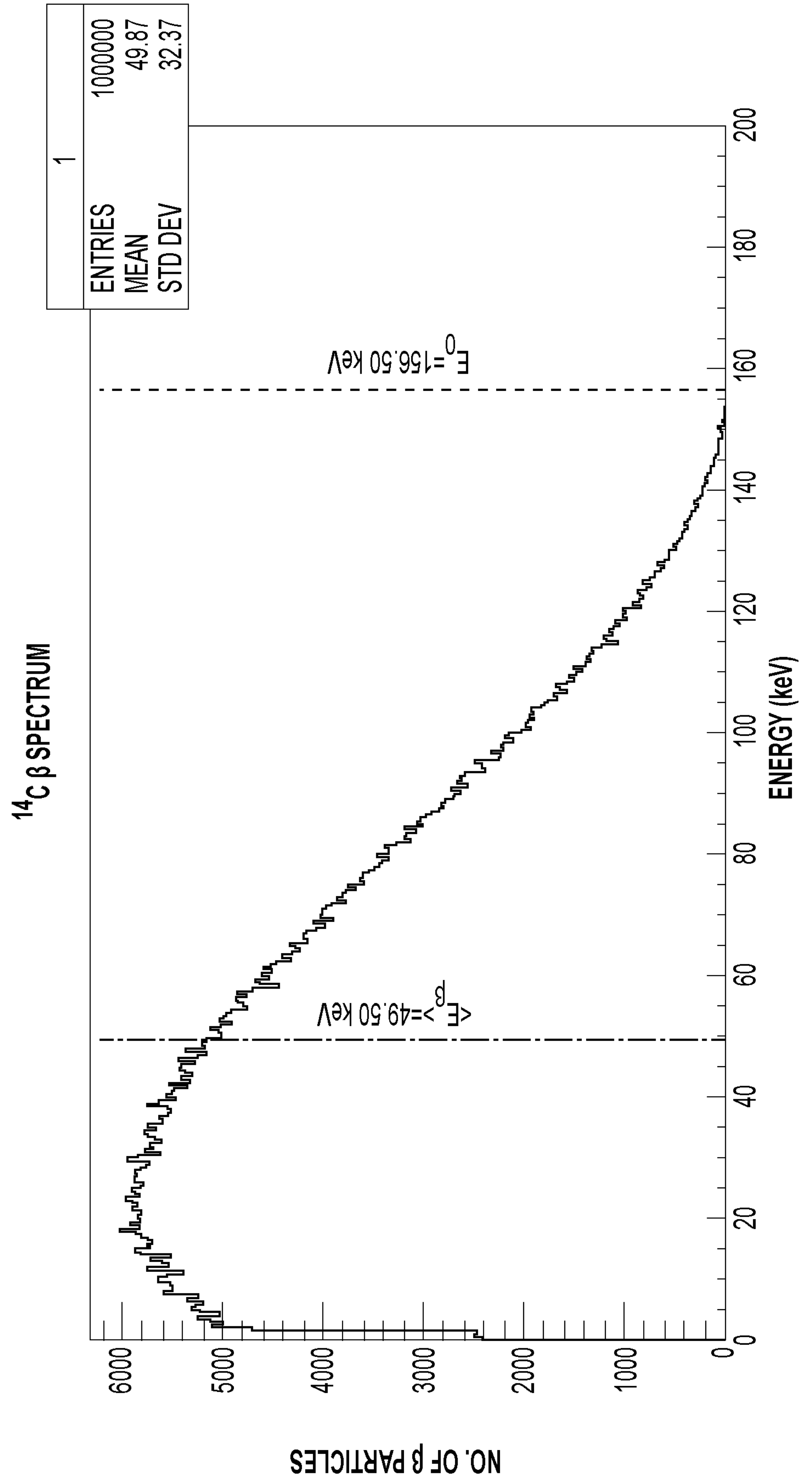
FIG. 2B shows the simulated beta (β) spectra for $^{14}$C.
Figure 2C:
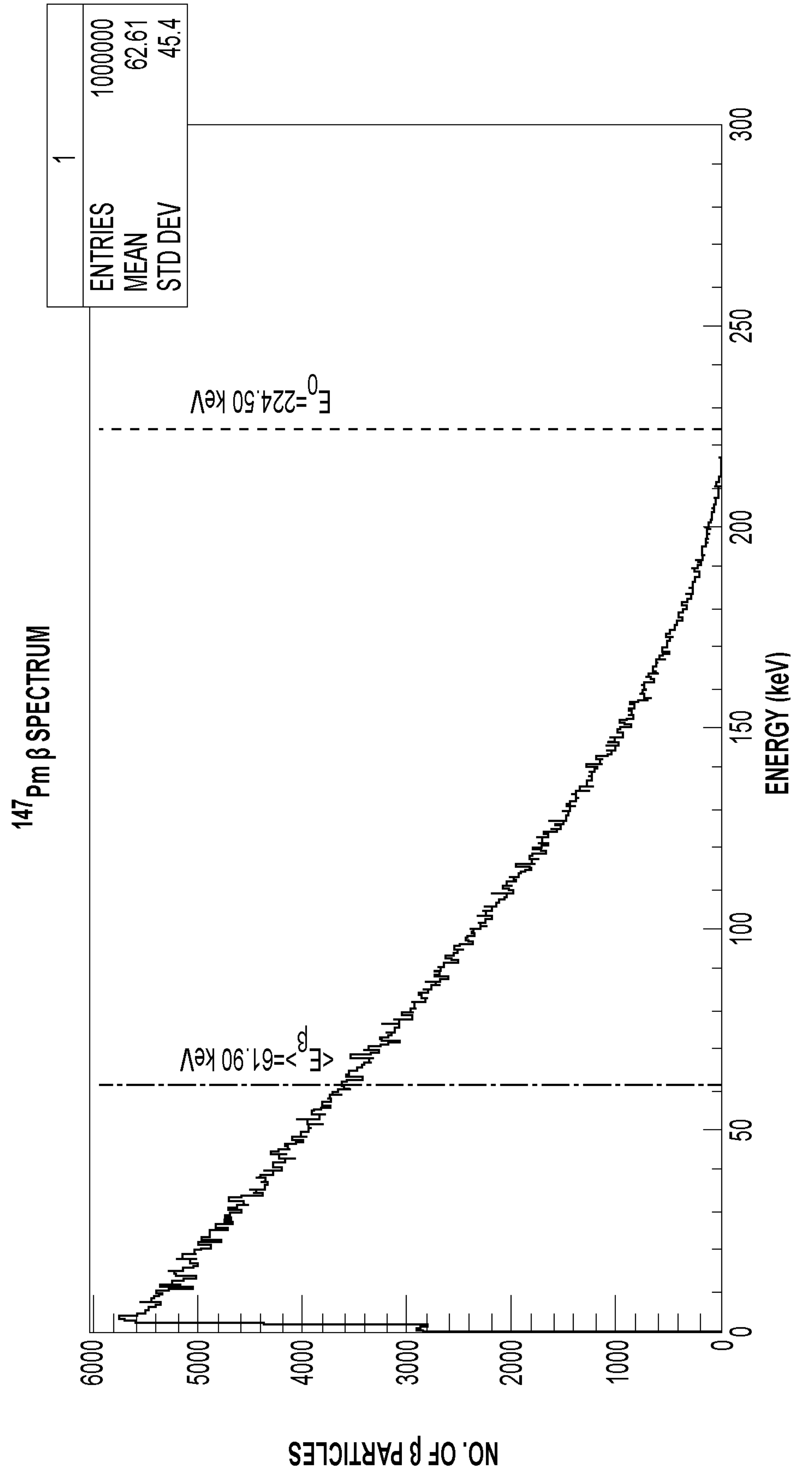
FIG. 2C shows the simulated beta (β) spectra for $^{147}$Pm.

FIGS. 2A, 2B and 2C show simulated β spectra used to validate the source models in the simulations. The vertical dash-dot-dash lines mark the DDEP/LNHB reference values for the mean energy $\langle E_\beta \rangle$ and the vertical dash-dash lines mark the DDEP/LNHB reference values for the endpoint $E_0$. The agreement in endpoint and overall spectral shape supports the correctness of the emission models employed in the simulations. FIGS. 2A, 2B and 2C show the simulated spectra from $^{63}$Ni, $^{14}$C and $^{147}$Pm beta sources, respectively.

Figure 3A:
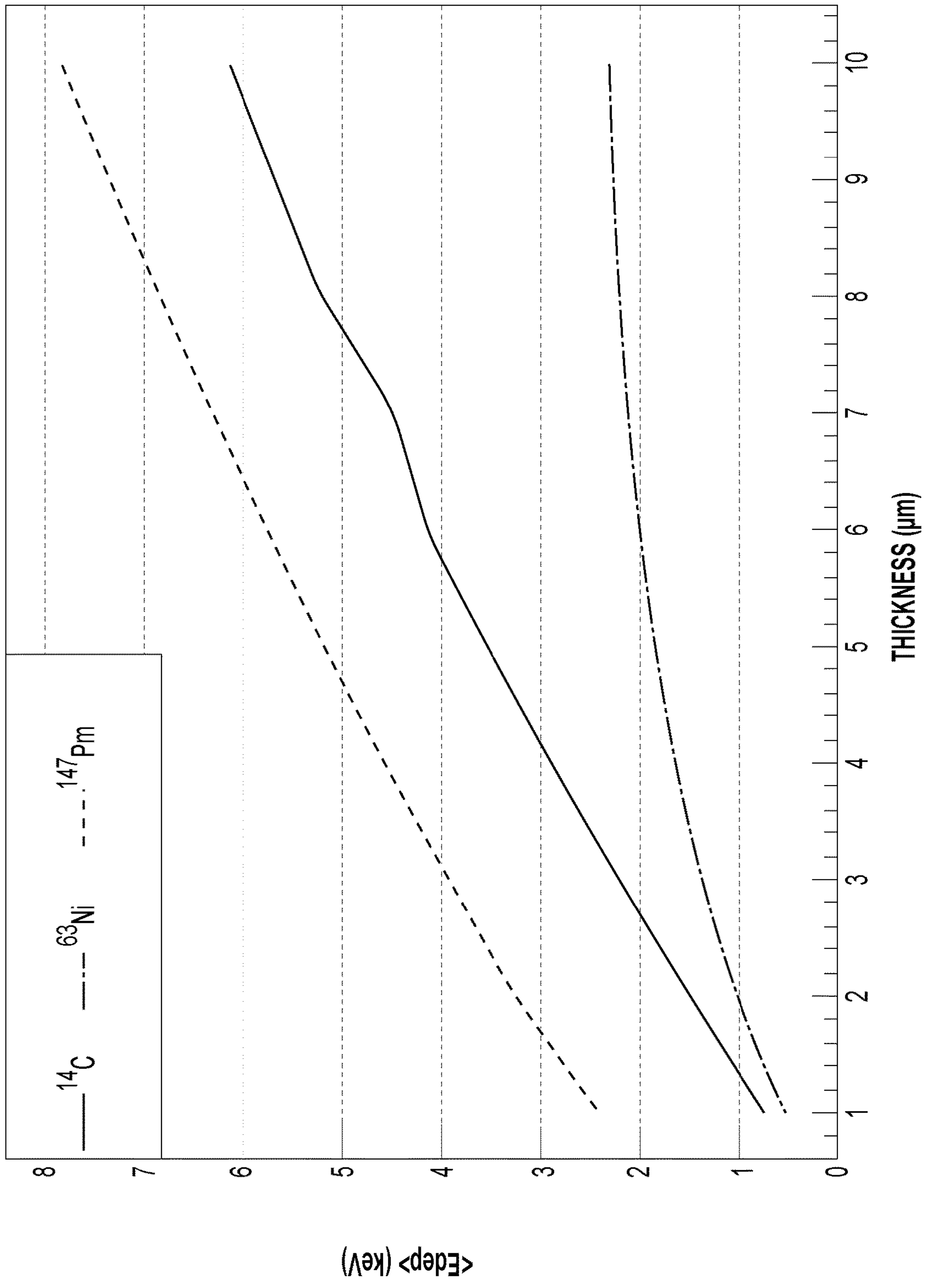
FIG. 3A shows the simulated results for the mean energy deposition in a SiSn active semiconductor layer of the SiSn betavoltaic battery for beta (β) emissions from $^{63}$Ni, $^{14}$C and $^{147}$Pm.
Figure 3B:
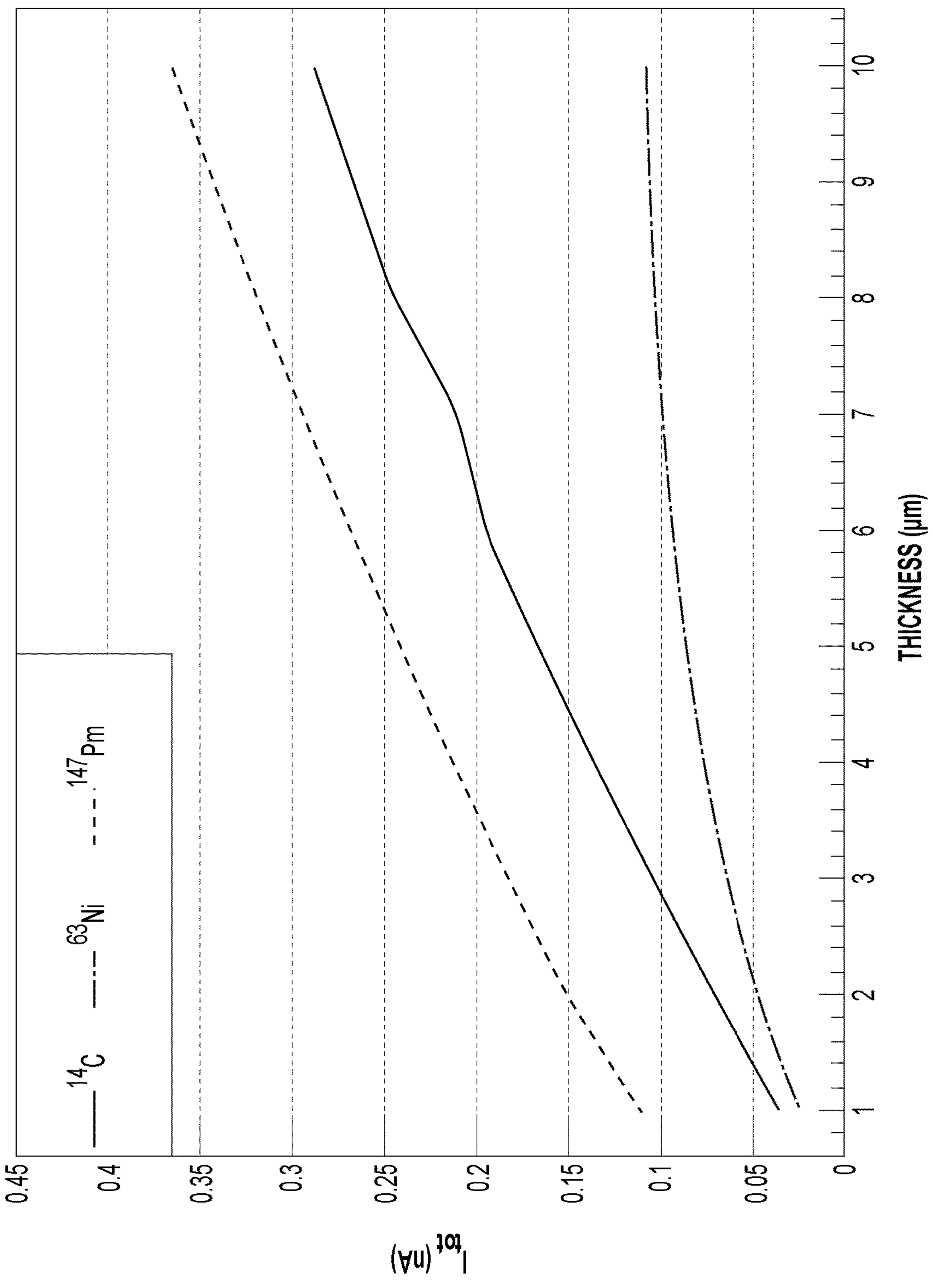
FIG. 3B shows the simulated results for the total current in the SiSn active semiconductor layer of the SiSn betavoltaic battery for beta (β) emissions from $^{63}$Ni, $^{14}$C and $^{147}$Pm.
Figure 3C:
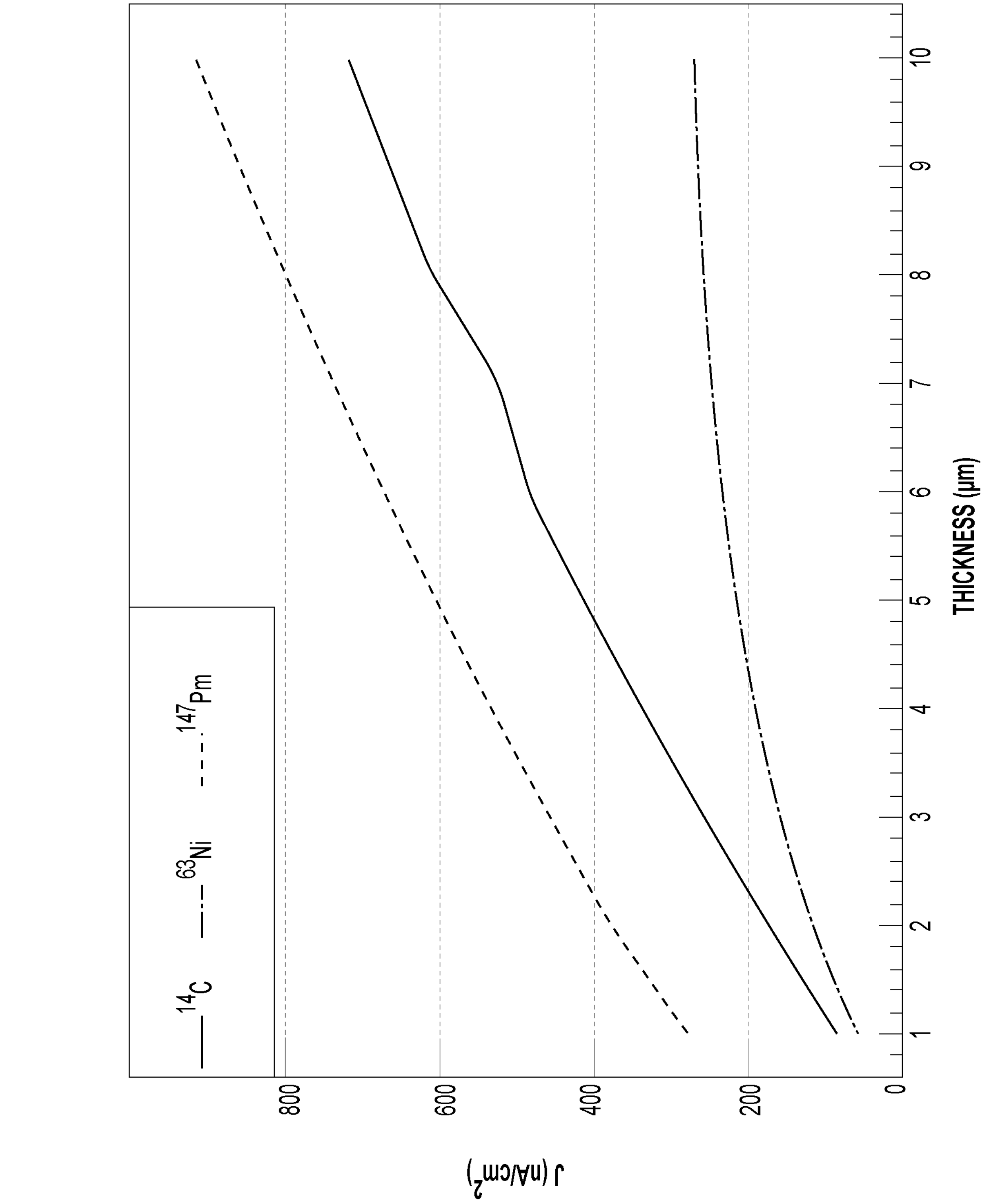
FIG. 3C shows the simulated results for the current density as a function of active layer thickness in the SiSn active semiconductor layer of the SiSn betavoltaic battery for beta (β) emissions from $^{63}$Ni, $^{14}$C and $^{147}$Pm.

FIGS. 3A, 3B and 3C illustrate the mean energy deposited per decay event ($\langle E_{dep} \rangle$), the total current ($II_{tot}$), and the current density (J) in the SiSn active layer, respectively, for the three isotopes $^{63}$Ni, $^{14}$C and $^{147}$Pm. As expected, the deposited energy increases monotonically with the active layer thickness and scales with the characteristic β energy spectrum of each isotope. For a 10 μm SiSn layer, $\langle E_{dep} \rangle$ is approximately 2.30 keV for $^{63}$Ni, 6.16 keV for $^{14}$C, and 7.83 keV for $^{147}$Pm. These values directly reflect the corresponding mean β energies of 17 keV, 49 keV, and 60 keV, respectively. The overall trend confirms that thicker SiSn layers absorb a larger fraction of the emitted β energy, leading to proportionally higher carrier generation and current density. Reducing the SiSn layer thickness to the nanoscale should increase carrier collection efficiency due to reduced recombination and shorter diffusion paths, though at the cost of slightly lower energy absorption. Nanostructured geometries could combine high surface area with efficient charge separation, mitigating the limitations observed in planar geometries.

To enable a comparison with reported planar betavoltaic devices, the simulated current densities were normalized to the standard convention of nA cm$^{-2}$ per 1 MBq cm$^{-2}$ of areal activity. In the simulations, the β source was treated as a point emitter located 20 μm from the SiSn stack. The effective activity incident on the device surface ($R_{inc}$) was therefore scaled by the solid angle Ω subtended by the active area ($A_{active}=4\times10^{-4}$ cm$^2$) according to $$R_{inc} = \frac{R_{point}\Omega}{4\pi A_{active}}.$$

The simulated normalized short-circuit current density, $J_{sc}$ (nA/cm$^2$) for a 10 μm SiSn layer with beta emissions from $^{63}$Ni is 0.27 nA/cm$^2$. For beta emissions from $^{14}$C, the $J_{sc}$ is 0.62 nA/cm$^2$. For beta emissions from $^{147}$Pm, the $J_{sc}$ is 0.78 nA/cm$^2$. For each isotope, these values correspond to 1 MBqcm$^{-2}$ equivalent activity. For purposes of comparison, a conventional Si p-i-n planar layer, with beta emissions from $^{63}$Ni, has a $J_{sc}$ of 0.17-0.20 nA/cm$^2$. A conventional GaN planar layer, with beta emissions from $^{63}$Ni, has a $J_{sc}$ of 0.0087 nA/cm$^2$. A conventional 4H—SiC p-n planar layer, with beta emissions from $^{14}$C, has a $J_{sc}$ of 0.43 nA/cm$^2$. A conventional GaN planar layer, with beta emissions from $^{147}$Pm, has a $J_{sc}$ of 0.44 nA/cm$^2$.

In the above, for the given geometry (Ω≈5.18 sr, Rpoint=1 MBq), the corresponding equivalent planar activity was approximately $R_{inc}\approx1000$ MBq cm$^{-2}$. Thus, the normalized current densities given above were obtained by dividing the simulated values from FIG. 3C by this areal-activity factor ($R_{inc}$/1 MBq cm$^{-2}$=1000). This normalization procedure allows direct benchmarking against experimental data in the literature, where planar sources are typically reported in terms of current density per 1 MBqcm$^{-2}$ of activity. The normalized results provided above show that the current density scales with the mean beta (β) energy of each isotope, reflecting the higher energy deposition and charge-carrier generation in the SiSn layer. The resulting values, on the order of 0.27-0.78 nA/cm$^2$ per 1 MBq cm$^{-2}$, are consistent with those reported for planar $^{63}$Ni and GaN or Si betavoltaic cells, confirming that the simulated SiSn configuration exhibits realistic performance within the expected range for flat betavoltaic geometries.

As noted above, the deposited energy within the SiSn layer increases with both the β particle energy of the isotope and the active layer thickness. For thin films, $^{63}$Ni yields sub-keV mean deposited energy per decay, whereas $^{147}$Pm exceeds 7 keV at a 10 μm thickness. The above normalized short-circuit current densities (0.27-0.78 nA/cm$^2$ per 1 MBq cm$^{-2}$) are consistent with reported values for planar betavoltaic devices, validating the physical accuracy of the model. The observed scaling behavior suggests that nano-engineered SiSn junctions with optimized geometry and carrier collection efficiency could achieve enhanced energy-conversion performance.

In simulations, graphene was chosen for the top electrode 14 primarily to evaluate beta particle transport through a thin front electrode and its influence on the energy deposited in the SiSn active region. Because graphene is extremely thin and composed of low-Z carbon atoms, it introduces minimal attenuation of incoming beta particles while still providing electrical conductivity. In the radiation-transport model, graphene therefore functions as a radiation-transparent conductive electrode positioned in front of the SiSn semiconductor. In addition to this role, graphene was selected as a candidate electrode material in the simulations because its work function can be tuned, allowing the graphene-SiSn interface to be engineered to form either a near-ohmic or a Schottky-type contact, depending on the desired device configuration. By adjusting the contact barrier through work-function engineering, the graphene-SiSn interface may contribute to the internal electric-field structure of the device and assist in the separation and collection of radiation-generated carriers. Thus, graphene may function both as a radiation-transparent conductive electrode for beta transport and also as part of an engineered contact interface whose barrier properties can be tuned to optimize carrier collection in the graded SiSn semiconductor structure.

Additional Monte Carlo simulations were performed to compare radiation energy deposition and estimated carrier generation in several semiconductor materials under identical modeled conditions. The simulated materials included pure silicon (Si), uniform and graded SiSn structures (5% Sn, 3-5-7% Sn, and 7-5-3% Sn), and GaN. All simulations used the same device geometry, beta source conditions ($^{63}$Ni), and electrode configuration so that the comparison reflected differences in material behavior rather than differences in device structure or irradiation conditions. The results demonstrate that SiSn-based semiconductor structures provide improved modeled carrier generation relative to conventional Si. In particular, the graded SiSn configurations exhibit increased electron-hole pair generation and higher predicted current density under the same irradiation conditions. In addition, the SiSn structures reduce the amount of energy and particle flux reaching the back metal electrode, indicating improved utilization of deposited beta energy within the semiconductor region.

For comparison, GaN was simulated as a representative wide-bandgap semiconductor reference. Although GaN reduces electron penetration into the back electrode due to its higher stopping power near the entrance surface, it produces substantially fewer electron-hole pairs because of its larger effective pair-creation energy. Consequently, the modeled carrier-generation efficiency of GaN is lower than that of the SiSn configurations under identical irradiation conditions. A quantitative comparison of the simulated performance metrics is summarized in Table 1.

TABLE 1

Comparative Simulation Results

| Material | Si | Uniform SiSn (5%) | Graded SiSn (7-5-3%) | Graded SiSn (3-5-7%) | GaN |
|---|---|---|---|---|---|
| Total Energy Deposited (keV/primary) | 5.24 | 5.19 | 5.16 | 5.22 | 4.83 |
| e-h/primary | 1454 | 1702 | 1694 | 1712 | 542 |
| Current Density (A/cm$^2$) | $6.12 \times 10^{-7}$ | $7.16 \times 10^{-7}$ | $7.13 \times 10^{-7}$ | $7.20 \times 10^{-7}$ | $2.28 \times 10^{-7}$ |
| Electrons Entering Au | 6756 | 5888 | 5904 | 5702 | 90 |
| Energy Deposited in Au (MeV) | 180.68 | 159.77 | 158.15 | 153.46 | 0.633 |
| Relative Carrier Gain vs. Si | 1 (Baseline) | +17.05% | +16.5% | +17.74% | −62.72% |

Figure 4:
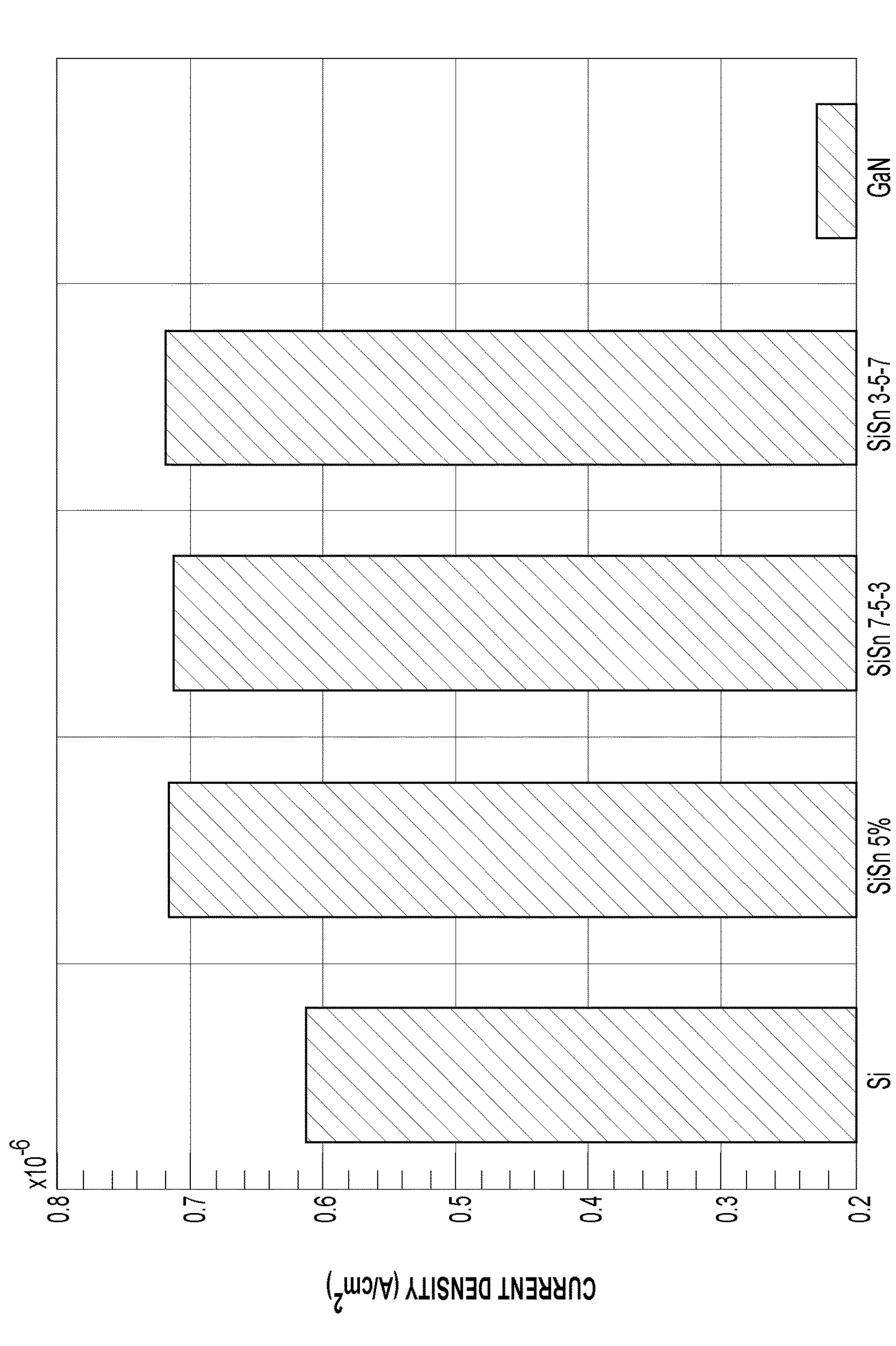
FIG. 4 is a graph comparing simulated current densities for Si, uniform SiSn (5% Sn), graded SiSn, and GaN semiconductor configurations under identical beta irradiation conditions.
Figure 5:
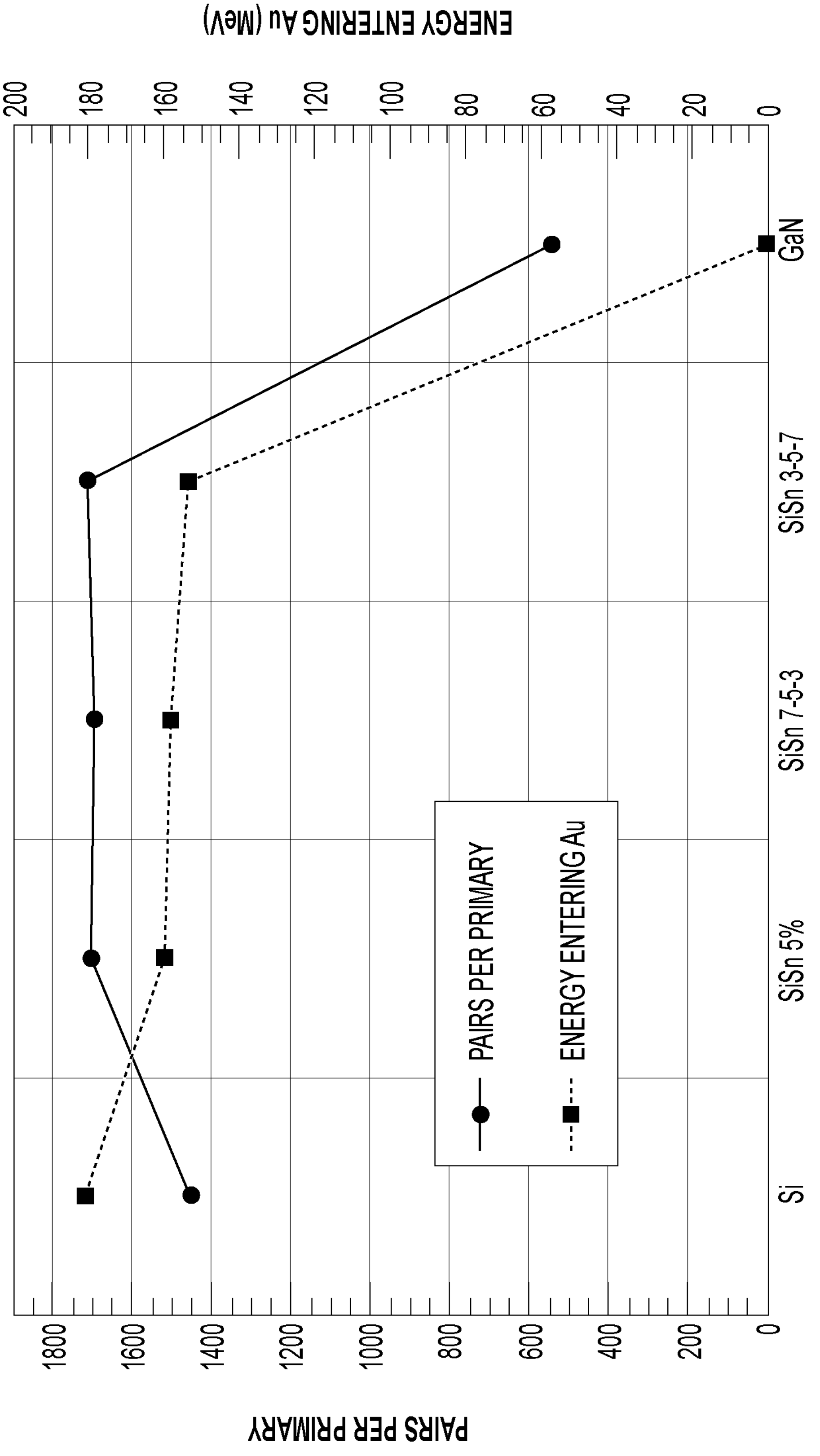
FIG. 5 is a graph comparing simulated electron-hole pair generation and energy reaching a gold bottom electrode for Si, uniform SiSn, graded SiSn, and GaN configurations under identical simulation conditions.
Figure 6:
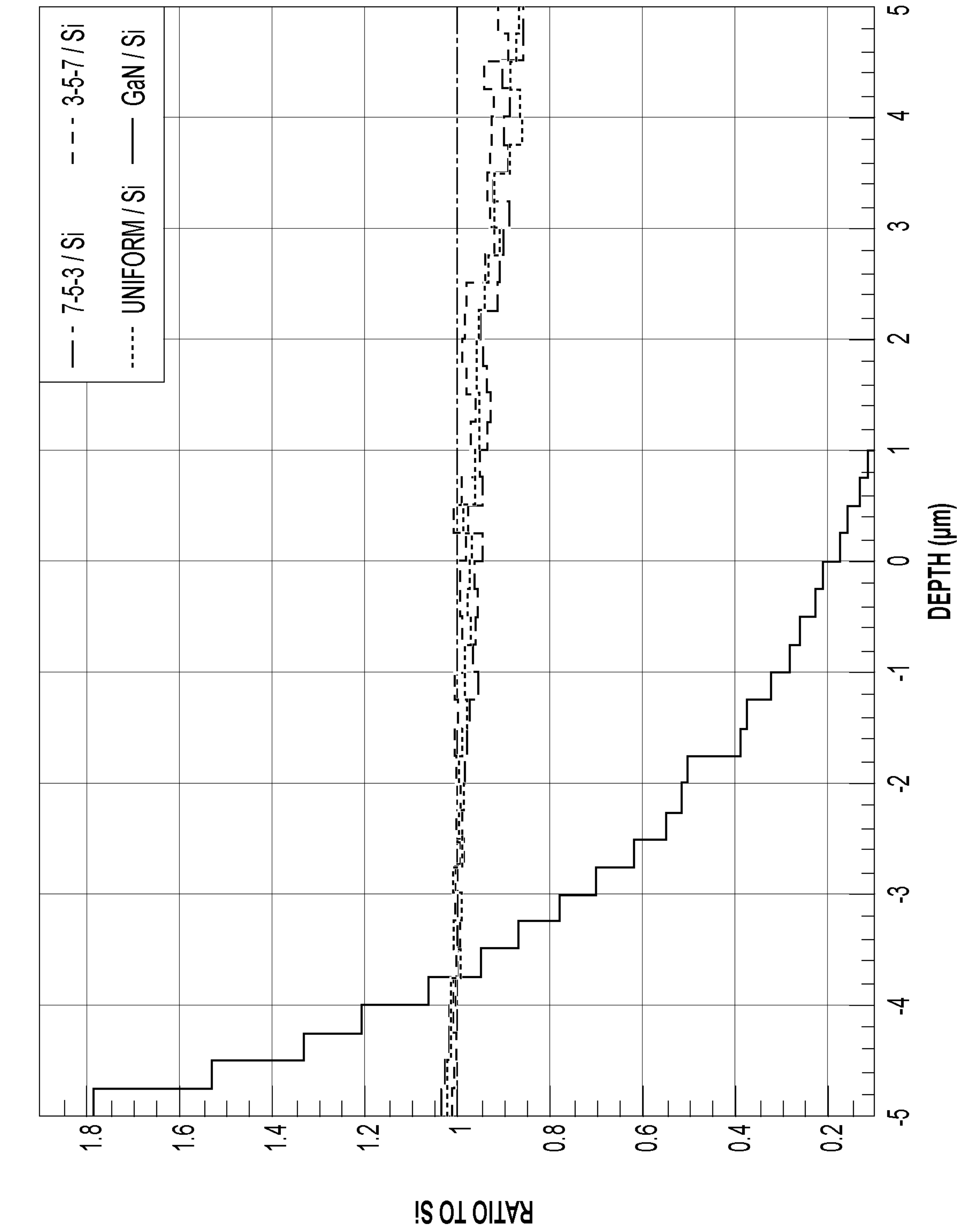
FIG. 6 is a graph showing the ratio of simulated energy deposition as a function of depth within the semiconductor active layer for uniform SiSn (5% Sn), graded SiSn structures (3-5-7% Sn and 7-5-3% Sn), and GaN relative to conventional Si under identical beta irradiation conditions.
Figure 7:
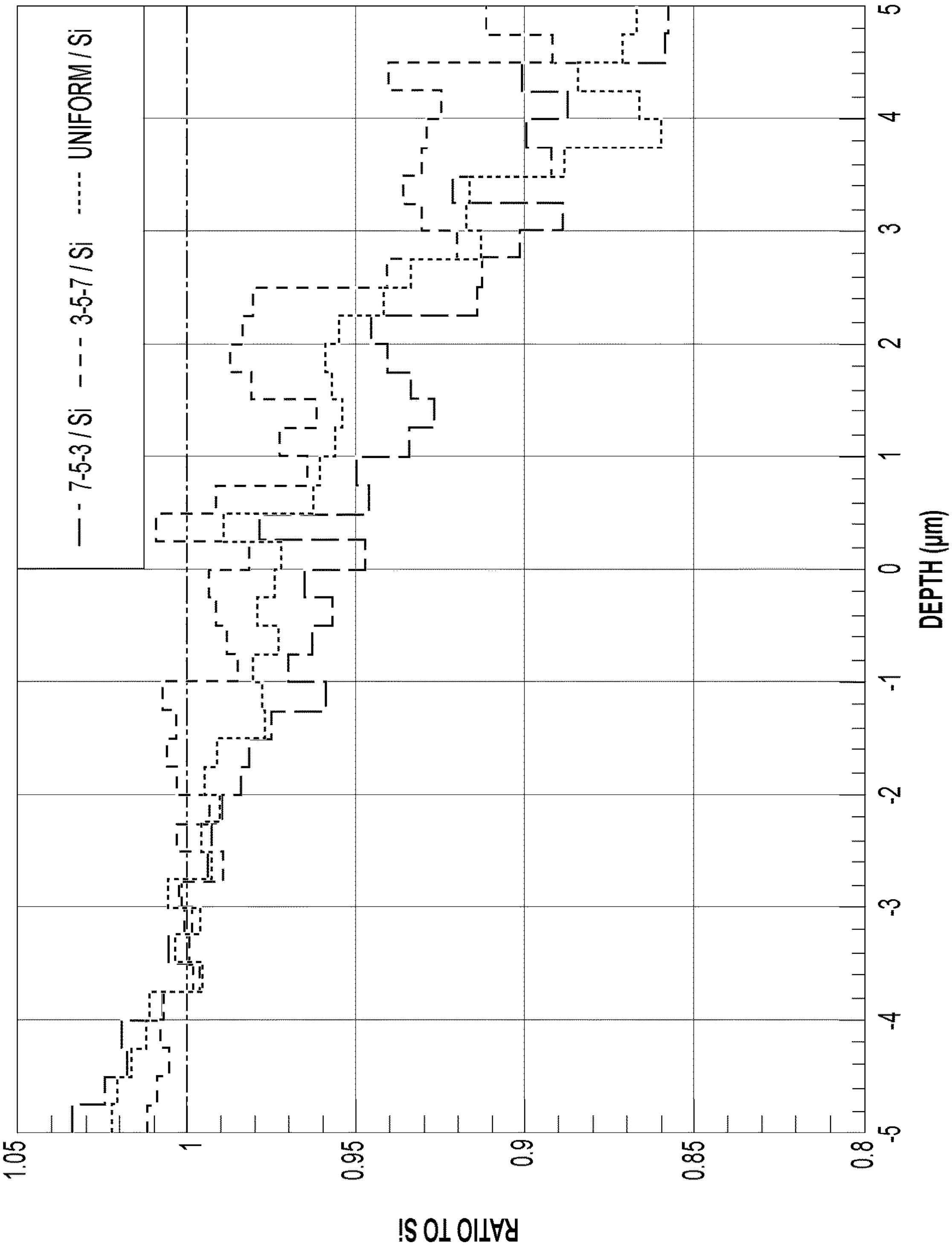
FIG. 7 is a graph showing the ratio of modeled energy deposition as a function of depth within the semiconductor active layer for uniform SiSn (5% Sn), and graded SiSn structures (3-5-7% Sn and 7-5-3% Sn) relative to conventional Si under identical beta irradiation conditions.

The corresponding comparisons of predicted current density and modeled electron-hole pair generation, together with energy reaching the Au back electrode, are shown in FIGS. 4 and 5, respectively. The depth-resolved energy-deposition distributions are illustrated in FIGS. 6 and 7. The depth-resolved energy deposition profiles further highlight the differences between GaN and the Si-based semiconductor structures. As shown in FIG. 6, GaN deposits a large fraction of the beta particle energy near the entrance surface of the semiconductor, followed by a rapid decrease with depth. This surface-dominated energy deposition limits the effective use of the semiconductor thickness for carrier generation. In contrast, the SiSn-based structures maintain energy-deposition profiles much closer to those of conventional Si across the entire active layer. This indicates that beta particles penetrate more uniformly through the semiconductor, allowing a larger fraction of the device volume to participate in carrier generation while reducing energy loss to the back electrode.

When GaN is excluded, the comparison among the Si-based materials (FIG. 7) shows that the graded SiSn configurations produce systematic variations in the depth-resolved energy-deposition profile relative to both Si and uniform SiSn. In particular, the 3-5-7% Sn structure maintains slightly higher relative energy deposition at larger depths within the semiconductor, indicating that the Sn gradient can be used to redistribute radiation energy within the active layer. These results collectively demonstrate that the compositionally engineered SiSn architecture provides improved carrier-generation potential relative to conventional Si while maintaining more favorable radiation-energy utilization than wide-bandgap materials, such as GaN.

In the simulations, the SiSn betavoltaic battery 10 was modeled as a planar multilayer structure, as diagrammatically illustrated in FIG. 1. This configuration was selected as a representative architecture for evaluating radiation transport, energy deposition, and carrier generation within the semiconductor using Monte Carlo modeling. The planar multilayer structure serves as a reference geometry for comparing semiconductor materials under controlled conditions. However, it should be understood that the SiSn betavoltaic battery is not limited to such a planar configuration. As a non-limiting example, the SiSn semiconductor structure may be implemented using nanostructured geometries, such as nanowire arrays, nanopillar structures, or other high-surface-area semiconductor architectures. Such configurations may improve carrier collection efficiency by reducing carrier transport distances and increasing the effective interaction area between the radiation source and the semiconductor material.

As another non-limiting example, the SiSn betavoltaic battery may employ radial or three-dimensional geometries, including cylindrical or spherical architectures in which the semiconductor structure surrounds or partially encloses the radiation source. These geometries may improve radiation capture efficiency by increasing the solid angle of interaction between emitted beta particles and the semiconductor active region. As a further non-limiting example, the radiation source may be integrated within the semiconductor structure rather than positioned externally. For example, the radioisotope material may be embedded between semiconductor layers, deposited within microchannels formed in the SiSn structure, or incorporated within porous or nanostructured semiconductor scaffolds. In such configurations, beta particles are emitted directly within, or in close proximity to, the semiconductor active region, thereby increasing the probability that emitted particles deposit their energy within the energy conversion medium. This architecture can improve radiation utilization efficiency by reducing losses associated with particle escape or absorption in surrounding materials.

It is to be understood that the SiSn betavoltaic battery is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A SiSn betavoltaic battery, comprising:

a SiSn active semiconductor layer;

a top electrode;

a bottom electrode, wherein the SiSn active semiconductor layer is sandwiched between the top and bottom electrodes; and a source of beta radiation located adjacent the top electrode.

2. The SiSn betavoltaic battery as recited in claim 1, wherein the SiSn active semiconductor layer comprises a $Si_{0.95}Sn_{0.05}$ alloy.

3. The SiSn betavoltaic battery as recited in claim 1, wherein the SiSn active semiconductor layer is a silicon-tin alloy with a concentration of the tin comprising between 1% and 15% of the silicon-tin alloy.

4. The SiSn betavoltaic battery as recited in claim 1, wherein the SiSn active semiconductor layer is a silicon-tin alloy with a concentration of the tin varying as a function of thickness of the SiSn active semiconductor layer.

5. The SiSn betavoltaic battery as recited in claim 1, wherein the top electrode comprises graphene.

6. The SiSn betavoltaic battery as recited in claim 5, wherein the bottom electrode comprises gold.

7. The SiSn betavoltaic battery as recited in claim 6, wherein the bottom electrode and the SiSn active semiconductor layer form a Schottky junction.

8. The SiSn betavoltaic battery as recited in claim 1, wherein the source of beta radiation is selected from the group consisting of $^{63}Ni$, $^{14}C$, and $^{147}Pm$.

9. The SiSn betavoltaic battery as recited in claim 1, wherein the top electrode has a thickness of 5 nm.

10. The SiSn betavoltaic battery as recited in claim 9, wherein the bottom electrode has a thickness of approximately 200 nm.

11. The SiSn betavoltaic battery as recited in claim 10, wherein the SiSn active semiconductor layer has a thickness between 1.0 μm and 10 μm.

* * * * *